(12) United States Patent
Choi et al.

(10) Patent No.: US 12,330,242 B2
(45) Date of Patent: Jun. 17, 2025

(54) WELD BEAD INSPECTION APPARATUS

(71) Applicant: WONIK HOLDINGS CO., LTD., Pyeongtaek-si (KR)

(72) Inventors: Myeng Jin Choi, Anseong-si (KR); Seung Il La, Yongin-si (KR); Ka Rim Jung, Suwon-si (KR)

(73) Assignee: WONIK HOLDINGS CO., LTD., Pyeongtaek-si (KR)

( * ) Notice: Subject to any disclaimer, the term of this patent is extended or adjusted under 35 U.S.C. 154(b) by 96 days.

(21) Appl. No.: 17/792,790

(22) PCT Filed: Jan. 13, 2021

(86) PCT No.: PCT/KR2021/000485
§ 371 (c)(1),
(2) Date: Jul. 14, 2022

(87) PCT Pub. No.: WO2021/145679
PCT Pub. Date: Jul. 22, 2021

(65) Prior Publication Data
US 2023/0035418 A1 Feb. 2, 2023

(30) Foreign Application Priority Data
Jan. 14, 2020 (KR) .................. 10-2020-0004571

(51) Int. Cl.
*B23K 31/12* (2006.01)
*G01N 21/88* (2006.01)
(Continued)

(52) U.S. Cl.
CPC ....... *B23K 31/125* (2013.01); *G01N 21/8806* (2013.01); *G01N 21/952* (2013.01);
(Continued)

(58) Field of Classification Search
CPC B23K 31/125; B23K 2101/10; B23K 26/032; G01N 21/8806; G01N 21/952; H04N 7/183; H04N 23/56
See application file for complete search history.

(56) References Cited

U.S. PATENT DOCUMENTS

2014/0260705 A1* 9/2014 Kimpel, Jr. ........ G01B 11/0616
73/865.8
2018/0001422 A1* 1/2018 Rajagopalan ........ B23K 26/282
(Continued)

FOREIGN PATENT DOCUMENTS

| JP | 2007-327850 A | 12/2007 |
|---|---|---|
| KR | 10-1002628 B1 | 12/2010 |
| KR | 10-1424774 B1 | 8/2014 |

*Primary Examiner* — Richard T Torrente
(74) *Attorney, Agent, or Firm* — Rabin & Berdo, P.C.

(57) ABSTRACT

The present invention relates to a weld bead inspection apparatus and, more specifically, to a weld bead inspection apparatus capable of precisely inspecting a weld bead. The present invention relates to the weld bead inspection apparatus for inspecting whether a weld bead (20) on a pipe (10) is defective, and disclosed is the weld bead inspection apparatus comprising: a housing (100) encompassing the pipe (10) so as to cover the weld bead (20), and forming a closed inspection space (S) therein; an inspection means (200) provided in the housing (100) so as to confirm the state of the weld bead (20) in the inspection space (S); and a defect determination unit for determining whether the weld bead (20) is defective on the basis of the state of the weld bead (20), having been confirmed through the inspection means (200).

9 Claims, 5 Drawing Sheets

(51) Int. Cl.
*G01N 21/952* (2006.01)
*G06T 7/00* (2017.01)
*H04N 7/18* (2006.01)
*H04N 23/56* (2023.01)
*B23K 101/10* (2006.01)

(52) U.S. Cl.
CPC ........... *G06T 7/0002* (2013.01); *H04N 7/183* (2013.01); *H04N 23/56* (2023.01); *B23K 2101/10* (2018.08)

(56) References Cited

U.S. PATENT DOCUMENTS

2019/0321905 A1* 10/2019 Wang ..................... B23K 9/167
2022/0297246 A1*  9/2022 Okuma ................... B23K 9/12

* cited by examiner

WELD BEAD INSPECTION APPARATUS

TECHNICAL FIELD

The present invention relates to a weld bead inspection apparatus, and more particularly, to a weld bead inspection apparatus capable of precisely inspecting a weld bead.

BACKGROUND ART

In general, welding is being widely used to bond metal materials to each other by performing direct interatomic bonding between two solid materials.

In particular, the welding is used for installing pipes used in a substrate processing apparatus and a substrate processing system for semiconductor manufacturing processes, and if there is a defect in such welding, there is a threat to worker safety due to leakage of chemicals used for the substrate processing, etc. As a result, an inspection apparatus for determining whether the welding is defective is required.

According to the related art, a skilled worker directly inspects a weld bead from the outside with the naked eye to determine the completeness of the welding and the presence or absence of defects. However, there are problems in that the defect determination ability is different depending on the skill level and work condition of the worker and is not objective to increase in inspection cost.

Thus, an apparatus for determining whether the weld bead is defective by irradiating laser beam onto a surface of the weld bead has been developed. However, since an object to be inspected has to be placed in a correct position of the apparatus, there is a problem in that there is a limitation in inspecting a narrow section and the highness section.

In addition, although some of inspection methods for photographing an image of the weld bead using a camera have been disclosed, there is a problem in that accurate inspection is impossible because the image photographed according to illuminance of the work environments is changed.

DISCLOSURE OF THE INVENTION

Technical Problem

To solve the above problems, an object of the present invention is to provide a weld bead inspection apparatus capable of enabling constant and precise weld bead inspection while having excellent portability.

Technical Solution

The present invention is invented to achieve the object of the present invention as described above, and the present invention relates to a weld bead inspection apparatus, which inspects whether a weld bead (20) of a pipe (10) is defective, including: a housing (100) surrounding the pipe (10) to cover the weld bead (20) and forming a sealed inspection space (S) therein; an inspection means (200) installed in the housing (100) to check a state of the weld bead (20); and a defect determination unit configured to determine whether the weld bead (20) is defective based the state of the weld bead (20) that is checked through the inspection means (200).

The housing (100) may be portable to be detached from the weld bead (200) of the previously installed pipe (10).

The inspection means (200) may be installed to face the weld bad (20) on an inner surface of the housing (100).

The inspection means (200) may include a vision inspection part (210) configured to photograph an image of the weld bead (20), and a lighting part (230) configured to generate appropriate illuminance in the inspection space (S) for photographing the image through the vision inspection part (210).

The inspection means (200) may include a laser inspection part (220) configured to measure displacement of the weld bead (20).

The inspection means (200) may be rotatable along an outer circumferential surface of the pipe (10) on an inner surface of the housing (100).

The inspection means (200) may be installed in plurality along an outer circumferential surface of the pipe (100) on an inner surface of the housing (100).

The pipe (10) may be installed to supply and discharge a gas in a substrate processing apparatus and substrate processing system for substrate processing.

The inspection means (200) may include a leak sensor configured to determine whether the gas leaks.

The defect determination unit may determine whether the weld bead (20) is defective through at least one of a width (W) and height of the weld bead (20) or whether a microhole exists in the weld bead (20), which are checked through the inspection means (200).

The defect determination unit may determine whether the weld bead (20) is defective depending on whether distances from a pair of horizontal marking lines (L), which are displayed to be spaced apart from both ends of the weld bead (20) in the pipe (10), to a center (C) of the weld bead (20) are the same.

Advantageous Effects

The weld bead inspection apparatus according to the present invention may have the advantages of being able to inspect the previously installed object because the weld bead inspection apparatus is excellent in portability and easy to be attached and detached to the weld bead portion.

Particularly, the weld bead inspection apparatus according to the present invention may have the advantages of being able to inspect the previously installed object regardless of the environments of the compact object and stably perform the weld bead inspection even in the section that is difficult to access such as the narrow section and the highness section.

In addition, the weld bead inspection apparatus according to the present invention may provide the consistent inspection space and allow the inspection through the constant light. Therefore, there may be the advantage in that the weld bead inspection is stably performed even in change of the external environment during the inspection.

In addition, the weld bead inspection apparatus according to the present invention may perform the various inspections through the various parameters of the weld bead using the inspection means, rather than the subjective inspection of the worker, and determine whether the defects occur based on the numerical data. Therefore, there may be the advantage of realizing the weld bead inspection having the high reliability.

In addition, the weld bead inspection apparatus according to the present invention may measure the various parameters of the weld bead portion and determine whether the defects occur through the preset algorithm based on the measured parameters. Therefore, there may be the advantage of realizing the consistent, reliable, and rapid inspection.

MODE FOR CARRYING OUT THE INVENTION

Hereinafter, a weld bead inspection apparatus according to the present invention will be described with reference to the accompanying drawings.

As illustrated in FIGS. 1 to 4, a weld bead inspection apparatus according to the present invention is a weld bead inspection apparatus that inspects whether a weld bead 20 on a pipe 10 is defective and includes a housing 100 surrounding the pipe 10 to cover the weld bead 20 and forming a sealed inspection space S therein, an inspection means 200 installed in the housing 100 to check a state of the weld bead 20, and a defect determination unit determining whether the weld bead 20 is defective based the state of the weld bead 20 that is checked through the inspection means 200.

The pipe 10 used here may be an object to be bonded through welding and may have various configurations.

For example, the pipe 10 may be installed for supplying and discharging a gas in a substrate processing apparatus and substrate processing system for substrate processing. A plurality of pipes 10 may be installed to be welded to each other to realize various types of pipe systems according to installation environments of the substrate processing apparatus and substrate processing system.

Here, when the pipe 10 is welded, in order to determine whether the welding is defective, marking lines L that are horizontal to each other may be displayed at ends of the pipes 10, respectively.

That is, in the pipe 10, whether the weld bead 20 is defective may be determined through a distance and a degree in parallel between a central line of the weld bead 20 and the previously displayed marking line L during the welding. Here, the marking line L may be used as one reference.

The marking line L may be displayed in various manners, and, for example, may be displayed along a circumference on an end side of the pipe 10 using a laser and may be displayed at a point that is spaced a predetermined distance from an end of the pipe 10 in consideration of a width in which the weld bead 20 is expected to be formed.

The weld bead 20 is a portion at which ends of the pair of pipes 10 may be in contact with each other so as to be welded and may have various configurations.

For example, the weld bead 20 may be formed to have a certain width based on a welding point as the pair of pipes 10 are bonded to each other through the welding. Furthermore, the weld bead 20 may be formed to have a certain height from the pipe 10.

The housing 100 surrounds the pipe 10 to cover the weld bead 20 and forms the sealed inspection space S therein and also has various configurations.

In addition, the housing 100 may be portable so as to be detached from the weld bead 20 of the pipe 10 installed previously.

For example, the housing 100 may include housing members 110 and 120 surrounding the pipe 10 to cover the weld bead 20 and a hinge part 130 installed on one end of each of the housing members 110 and 120 to allow the housing members 110 and 120 to hinge-rotate so as to surround the pipe 10.

The housing members 110 and 120 are formed as a pair to form the sealed inspection space S by being coupled to each other and have various configurations.

Figure 1:
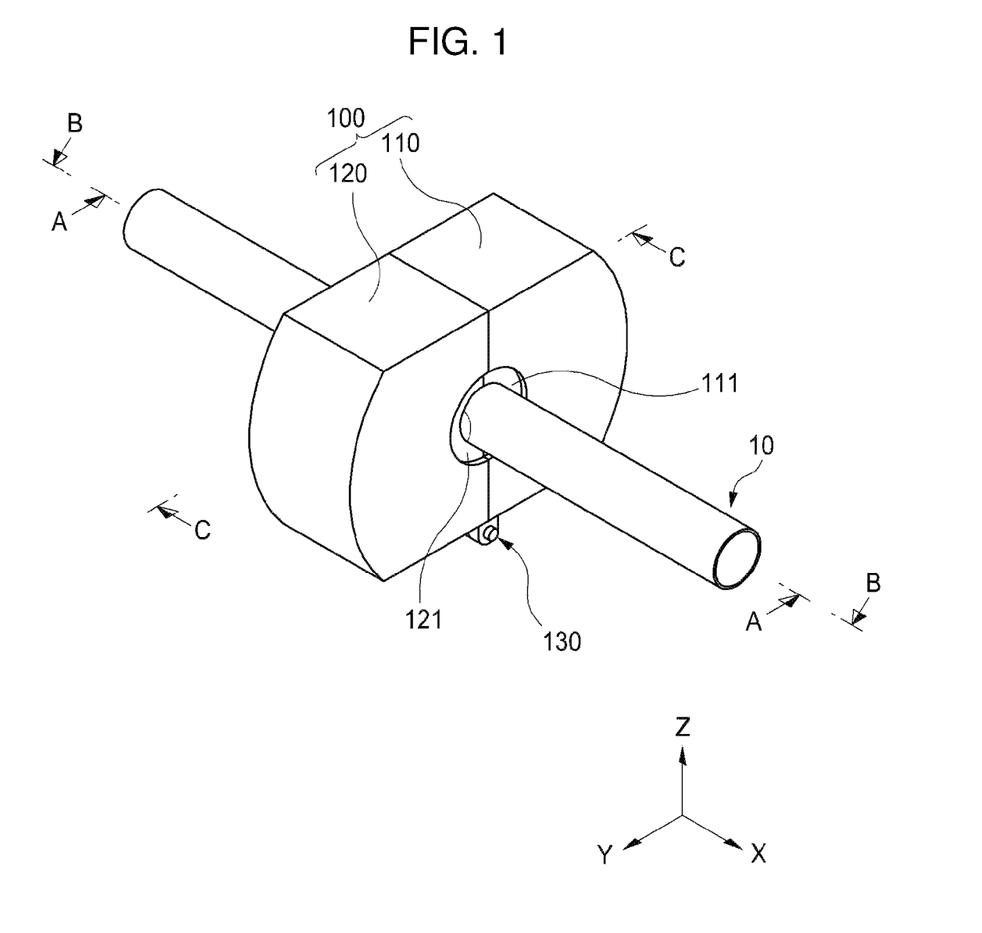
FIG. 1 is a perspective view illustrating a configuration of a weld bead inspection apparatus according to the present invention.

For example, as illustrated in FIG. 1, the housing members 110 and 120 may surround the outside of the pipe 10 and form the inspection space S corresponding to an outer circumference of the pipe 10.

Here, the housing members 110 and 120 may be coupled to be in contact with each other in a semicircular shape in a front view so as to correspond to the outer circumference of the pipe 10 and thus surround the pipe 10 to from the inspection space S. For another example, a periphery of each of the housing members 110 and 120 may have an angled shape including a curve and a partial linear structure in the front view.

The housing members 110 and 120 may be coupled to each other to form the sealed dark inspection space S, thereby creating a constant illuminance atmosphere for the inspection through the inspection means 200 to be described later so that consistent inspection is realized.

For this, in the housing members 110 and 120, the sealing members 111 and 121 may be formed at both ends thereof, which are in contact with the pipe 10, and both the ends of the housing members 110 and 120 may be in close contact with the pipe 10 to seal the inspection space S, thereby forming a dark space.

Furthermore, the housing members 110, 120 may be made of an elastic material at both the end portions that are in contact with the pipe 10 so that the housing members 110 and 120 are coupled to be in close contact with the pipe 10 having various sizes.

For example, the housing members 110 and 120 may be made of an elastic material at both the end portions that are in contact with the pipe 10, and when a diameter of the pipe 10 is relatively large, the elastic material may be pressed by elasticity and then be in close contact with the pipe 10. Thus, the housing members 110 and 120 may be applied to the pipe 10 having various diameters.

The housing members 110 and 120 may be maintained in a state in which lower ends of the housing members 110 and 120 are coupled to a hinge part 130. The housing members 110 and 120 may relatively rotate with respect to the hinge part 130 and then be coupled to the pipe 10. An upper end of each of the housing members 110 and 120, which is a side opposite to the portion at which the hinge part is installed, may be coupled in various coupling manners when being coupled to the pipe 10.

For example, the housing members 110 and 120 may be coupled in various manners such as a press-fitting manner using a plastic material, a bolt coupling manner, a coupling manner using magnetic force, and the like, and also, the housing members 110 and 120 may be coupled to form the inspection space S.

The hinge part 130 is coupled to one side of each of the housing members 110 and 120, and at least one of the housing members 110 and 120 relatively rotate to surround an outer circumference of the pipe 10 and has various configurations.

Figure 4:
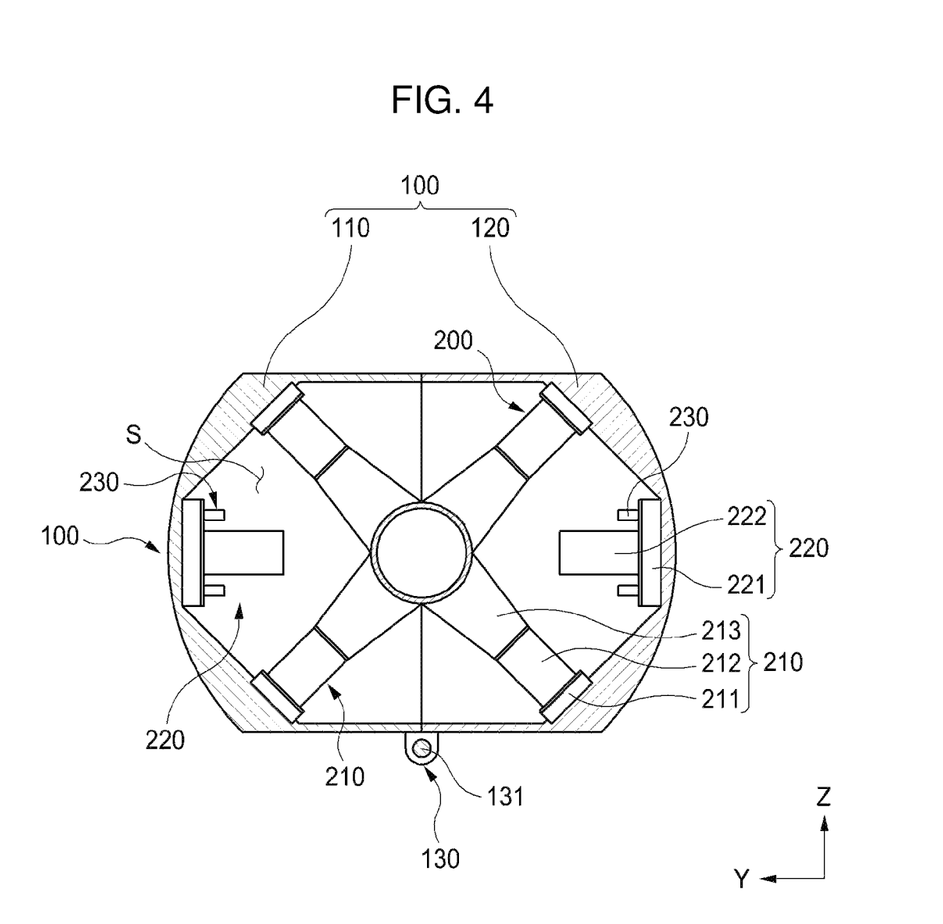
FIG. 4 is a cross-sectional view of the weld bead inspection apparatus of FIG. 1, taken along line C-C.

For example, as illustrated in FIG. 4, the hinge part 130 may rotate relative to a hinge shaft 131 passing through the pair of housing members 110 and 120. Thus, the hinge part 130 may rotate with respect to a lower end thereof, at which the hinge shaft 131 is installed, so that an upper end thereof is coupled or separated to be coupled to the pipe 10.

The inspection means 200 is installed in the housing 100 to check a state of the weld bead 20 in the inspection space S and has various configurations.

For example, the inspection means 200 may be installed from an inner surface, in which the inspection space S is formed, toward the weld bead 20.

More specifically, the inspection means 200 is installed to surround the outer circumference of the weld bead 20 on the inner surface in which the inspection space S of the housing 100 is formed, to inspect all portions of the weld bead 20 along a circumferential direction of the weld bead 20.

Furthermore, the inspection means 200 may be installed in plurality along an outer circumferential surface of the pipe 10 on the inner surface of the housing 100 to inspect all portions along the circumferential direction of the weld bead 20.

As another example, the inspection means 200 may be installed to be rotatable along the outer circumferential surface of the pipe 10 on the inner surface of the housing 100, and more specifically, may be rotatable within the housing 100 along the circumferential direction of the weld bead 20 to inspect the entire portion of the weld bead 20.

In this case, the inspection means 200 is provided with a rotational driving part (not shown) so as to be rotatable so that the inspection means 200 rotate along the inner surface of the housing 100 by using the weld bead 20 as a rotation axis. Here, a rotation guide may be formed on the inner surface of the housing 100 for stable rotation.

Figure 2:
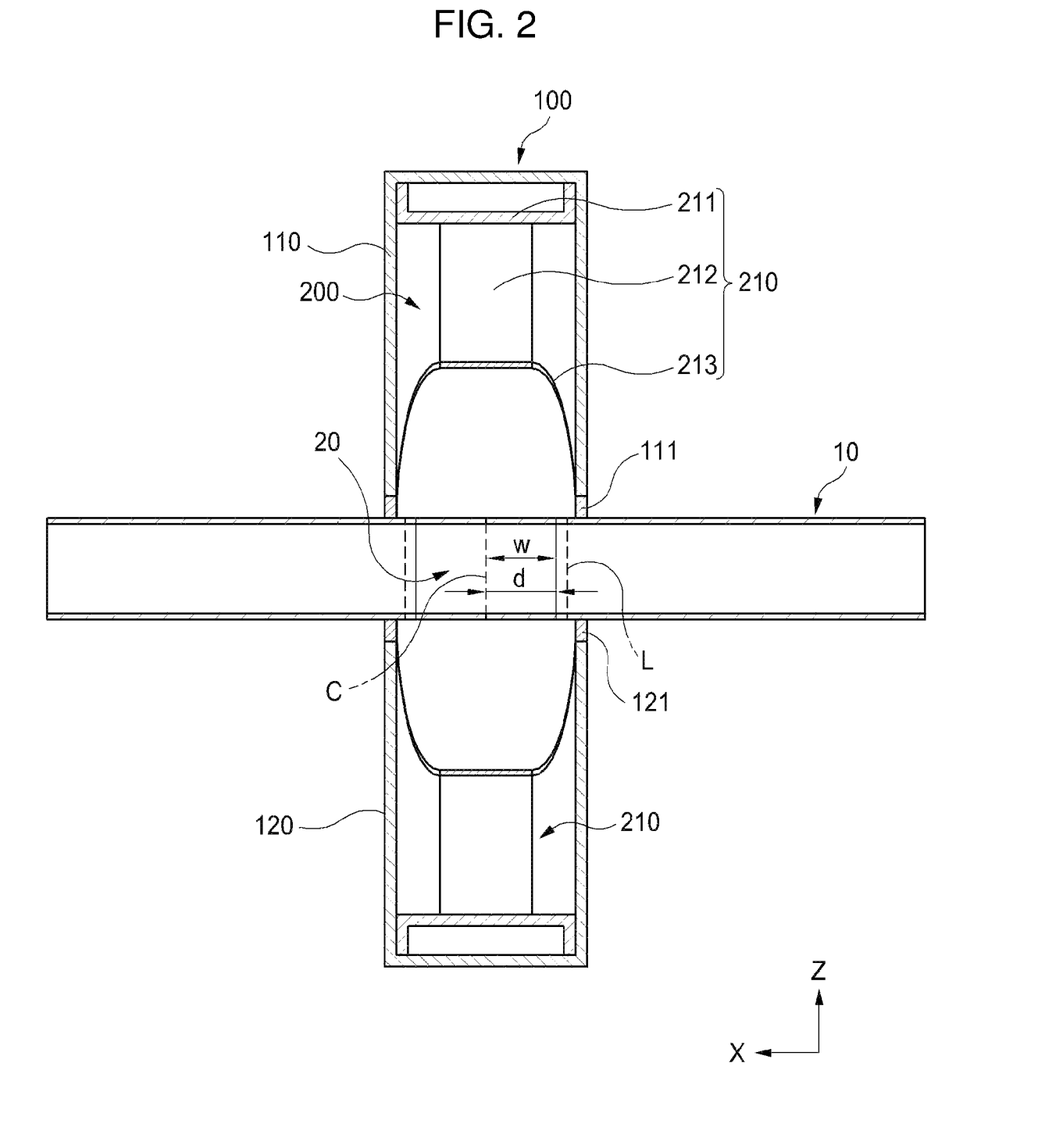
FIG. 2 is a cross-sectional view of the weld bead inspection apparatus of FIG. 1, taken along line A-A.

As illustrated in FIGS. 2 and 4, the inspection means 200 is configured to check the state of the weld bead 20 by photographing an image of the weld bead 20 and has various configurations.

For example, the inspection means 200 may include a vision inspection part 210 photographing the image of the weld bead 20 and a lighting part 230 for generating appropriate illuminance in the inspection space S for photographing the image through the vision inspection part 210.

The vision inspection part 210 is configured to photograph the image of the weld bead 20 has various configurations.

For example, the vision inspection part 210 may include a support 211 installed on the inner surface of the housing 100, a camera 212 coupled to protrude from the support toward the weld bead 20 to photograph the weld bead 20, and a protrusion guide 213 coupled to a front end of the camera 212 to be in contact with the weld bead 20.

The vision inspection part 210 may provide the image of the weld bead 20 so that the defect determination unit determines whether the weld bead 20 is defective through communication with the defect determination unit to be described later.

The support 211 is installed on the inner surface of the housing 100 and has various configurations.

For example, the support 211 may be provided on the inner surface of the housing 100 so that a camera 212 to be described later is stably installed.

The camera 212 is coupled to protrude from the support 211 toward the weld bead 20 so as to photograph the weld bead 20 and has various configurations.

For example, the camera 212 may be installed from the support 211 toward the weld bead 20, photograph the weld bead 20, and transmit the photographed image to the defect determination unit to determine whether the weld bead 20 is defective based on the photographed image of the weld bead 20.

In this case, the camera 212 may provide a two-dimensional image of the weld bead 20 having a curved shape.

The protrusion guide 213 is coupled to a front end of the camera 212 so as to be in contact with the weld bead 20 and has various configurations.

For example, the protrusion guide 213 may be coupled to both surfaces with respect to a lens of the camera 212 to protrude toward the weld bead 20, and an end of the protrusion guide 213 may have a curvature to be in contact with a portion of the circumference of the weld bead 20 and thus may be seated on the weld bead 20.

Figure 5:
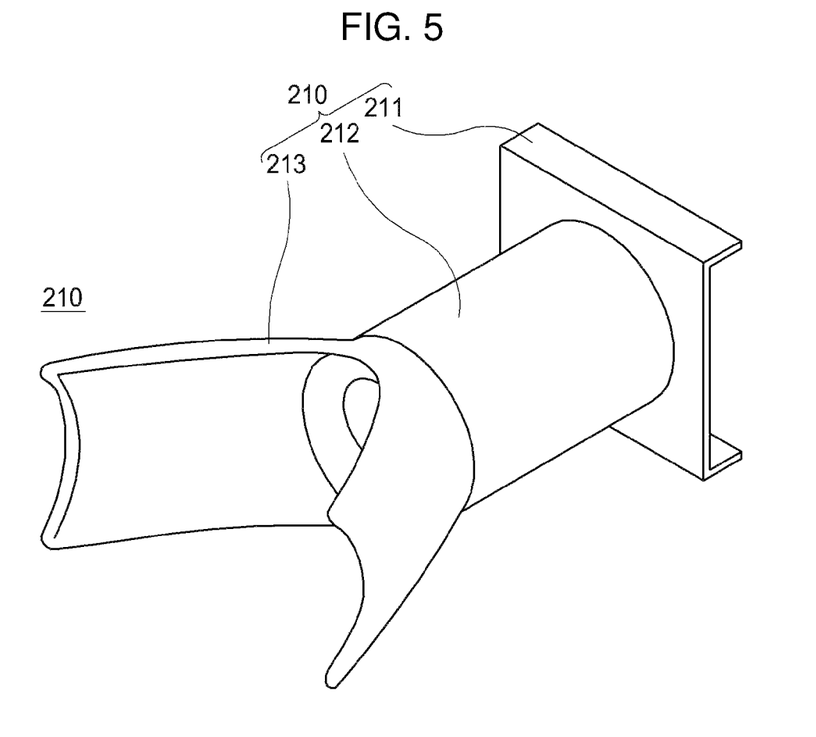
FIG. 5 is a perspective view illustrating a configuration of a vision inspection part of the weld bead inspection apparatus of FIG. 1.
Figure 6:
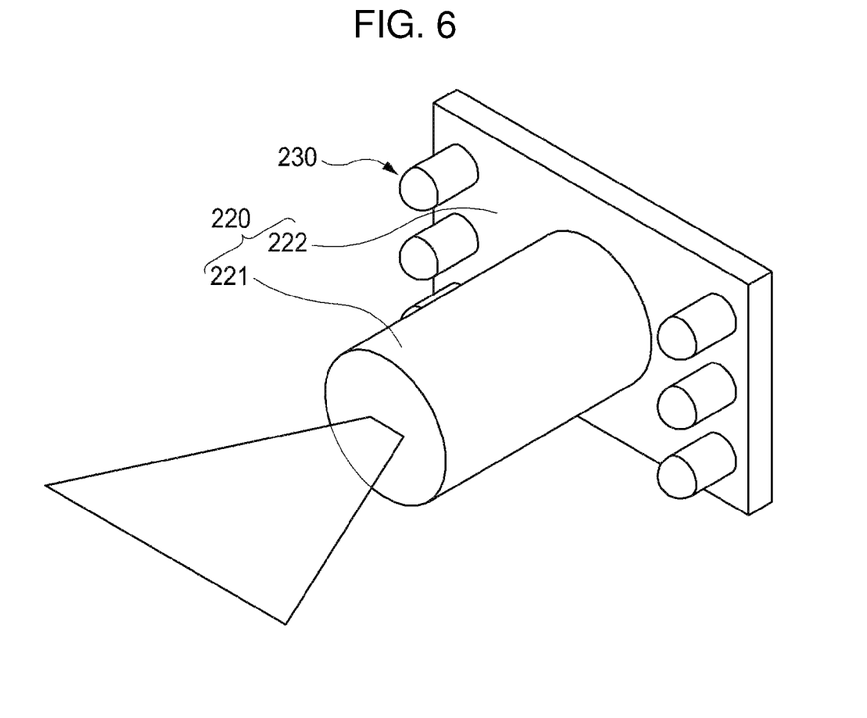
FIG. 6 is a perspective view illustrating a configuration of a laser inspection part of the weld bead inspection apparatus of FIG. 1.

Thus, the protrusion guide 213 may be seated to be in contact with the circumference of the weld bead 20 to guide the camera 212 so that the camera 212 photographs a correct position of the weld bead 20. More preferably, as illustrated in FIG. 5, a pair of cameras 212 may protrude from a side surface of the lens and is fitted to be in contact with the welding bead 20 so that the camera 212 photographs the correct position of the welding bead 20, which is a photographing object.

The vision inspection part 210 is rotatably installed on the inner surface of the housing 100 to photograph the circumference of the weld bead 20 through the rotation.

In addition, as another example, a plurality of vision inspection part 210 may be fixedly installed on the inner surface of the housing 100, for example, as illustrated in FIG. 4, four vision inspection parts 210 may be fixedly installed to photograph fixed positions of the weld bead 20 so as to images of the fixed positions of the weld bead 20, respectively.

In this case, eight protrusion guides 213 may be installed to surround the circumference of the weld bead 20.

The laser inspection part 220 is configured to measure displacement of the weld bead 20 and has various configurations.

For example, the laser inspection part 220 may include a laser support 222 installed on the inner surface of the housing 100 to install a laser module 221 and the laser module 221 installed on the laser support 220 to face the weld bead 20 so as to emit laser toward the weld bead 20.

The laser support 222 is provided on the inner surface of the housing 100 to stably install the laser module 221 and has various configurations.

In addition, in the laser support 222, a lighting part 230 to be described later may be additionally installed.

The laser module 221 is configured to emit laser toward the weld bead 20 so as to measure displacement of the weld bead 20 and has various configurations.

For example, the laser module 221 may emit and receive line beam to measure a height of a surface of the weld bead 20. For this, the laser module 221 may include a light emitting part for irradiating light and a light receiving part for receiving light.

Thus, the laser module 221 may check the height of the surface of the weld bead 20 as numerical data to provide the height value to the defect determination unit and may determine whether the weld bead 20 is defective through the defect determination unit based on the height of the surface of the weld bead 20.

The lighting part 230 is configured to generate appropriate illuminance in the inspection space S for photographing the image through the vision inspection part 210 and has various configurations.

For example, the lighting part 230 may be provided as an LED light and be installed on the inner surface of the housing 100 to generate appropriate illuminance in the inspection space S and also may be installed at any position inside the housing 100.

Figure 3:
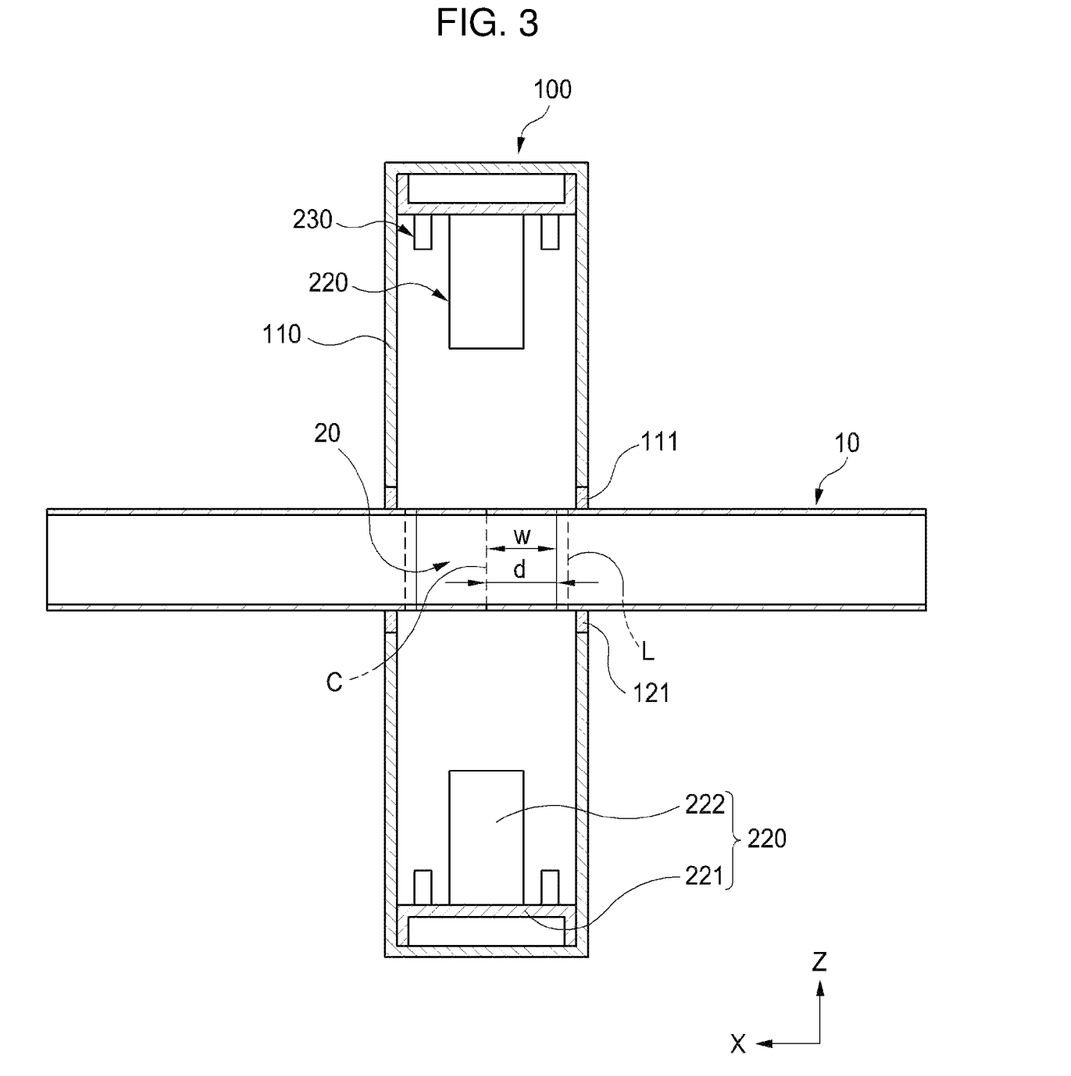
FIG. 3 is a cross-sectional view of the weld bead inspection apparatus of FIG. 1, taken along line B-B.

More specifically, the lighting part 230 may be installed on the support 211 of the vision inspection part 210 to generate illuminance for the photographing of the camera 212. For another example, as illustrated in FIG. 3, the lighting part 230 may be installed on the laser support 222 to generate appropriate illuminance in the inspection space S, thereby generating illuminance for the photographing of the camera 212.

The pipe 10 may be configured to supply and discharge a gas. Furthermore, the pipe 10 may be configured to supply and discharge a process gas for processing a substrate, and a passage through which the gas harmful to the human body flows may be formed in the pipe 10.

In this case, there is a problem in that a portion of the gas leaks from the weld bead 20 to cause an effect harmful to the human body or weakens durability of the weld bead 20 to cause continuous gas leakage.

Thus, the inspection means 200 may include a leak sensor determining whether a gas leaks in the pipe 10.

The leak sensor is configured to determine whether a gas leaks from the pipe 10 and has various configurations.

For example, the leak sensor may be installed on the inner surface of the housing 100 to sense the gas leakage in the weld bead 20. In addition, the leak senor may be installed in the pipe 10 of the housing 100 to seal the inspection space S, thereby stably sensing whether the gas leaks.

The inspection means 200 may include at least one of the vision inspection part 210, the laser inspection part 220, or the leak sensor, which are described above, and may be provided in the housing 100 according to a combination thereof.

The defect determination unit may be configured to determine whether the weld bead 20 is defective based on the state of the weld bead that is checked through the inspection means 200 and may have various configurations.

For example, the defect determination unit may determine whether the weld bead 20 is defective based on the image of the weld bead 20, which is photographed through the vision inspection part 210, and also determine whether the weld bead 20 is defective through the height of the weld bead 20, which is measured through the laser inspection part 220.

More specifically, the defect determination unit checks a width W of the weld bead 20 and whether a microhole or undercut exits on the image of the weld bead 20, which is photographed through the vision inspection part 210 to determine whether the weld bead 20 is defective. Furthermore, the defect determination unit may determine whether the weld bead 20 is defective according to whether distances from the pair of horizontal marking lines L, which are displayed to be spaced apart from both the ends of the weld bead 20 in the pipe 10, to a center C of the weld bead 20 are the same.

That is, whether the weld bead 20 is defective may be determined depending on whether the distances d from the center C of the weld bead 20 to the pair of marking lines L displayed on the pipes 10 disposed at both sides are the same. Here, if the distances are different from each other, it is determined that the weld bead 20 is defective.

In addition, whether the weld bead 20 is defective may be determined depending on whether the width W of the weld bead 20 is a preset appropriate value, and whether the microhole exists on the photographed image.

The defect determination unit may determine that the weld bead 20 is defective when the height of the weld bead 20 with respect to the pipe 10 is determined as being out of the preset range through the height of the weld bead 20, which is measured through the laser inspection part 220 as well as the vision inspection part 210.

In addition, when it is determined that a gas leaks through the leak sensor, the defect determination unit may determine that the weld bead 20 is defective.

The defect determination unit may comprehensively determine whether the weld bead 20 is defective through a combination of the vision inspection part 210, the laser inspection part 220, and the leak sensor, which are described above.

The weld bead inspection apparatus according to the present invention may be provided to be portable to determine whether the weld bead 20 in the previously installed pipe 10 is defective.

Particularly, the housing 100 may be provided to be portable by the worker and thus may be detached from the weld bead 20 of the previously installed pipe 10. Thus, whether the previously installed pipe 10 as well as a newly installed pipe 10 is defective may be determined.

Furthermore, whether the weld bead is defective may be determined regardless of the installation environment of the pipe 10. Particularly, whether the weld bead 10 of the pipe 10 is defective may be determined through simple installation due to the portability even in a narrow section and highness section, in which it is difficult to determine the installation environment by the worker' naked eye.

Although the above description merely corresponds to some exemplary embodiments that may be implemented by the present invention, as well known, the scope of the present invention should not be interpreted as being limited to the above-described embodiments, and all technical spirits having the same basis as that of the above-described technical spirit of the present invention are included in the scope of the present invention.

The invention claimed is:

1. A weld bead inspection apparatus, which inspects whether a weld bead of a pipe is defective, comprising:
   a housing;
   an inspection means installed in the housing to check a state of the weld bead; and
   a defect determination unit configured to determine whether the weld bead is defective based on the state of the weld bead that is checked through the inspection means,
   wherein the housing comprises housing members surrounding the pipe to cover the weld bead and the housing members comprise sealing members which are in contact with the pipe, to form a sealed dark inspection space,
   wherein the inspection means comprises:
   a vision inspection part configured to photograph an image of the weld bead; and a lighting part configured to generate appropriate illuminance in the sealed dark inspection space for photographing the image through the vision inspection part, and wherein the defect determination unit determines whether the weld bead is defective depending on whether distances from a pair of horizontal marking lines, which are previously displayed in the pipe to be spaced apart from both ends of the weld bead, to a center of the weld bead are the same.

2. The weld bead inspection apparatus of claim 1, wherein the housing is portable to be detached from the weld bead of the previously installed pipe.

3. The weld bead inspection apparatus of claim 1, wherein the inspection means is installed to face the weld bad on an inner surface of the housing.

4. The weld bead inspection apparatus of claim 1, wherein the inspection means comprises a laser inspection part configured to measure displacement of the weld bead.

5. The weld bead inspection apparatus of claim 1, wherein the inspection means is rotatable along an outer circumferential surface of the pipe on an inner surface of the housing.

6. The weld bead inspection apparatus of claim 1, wherein the inspection means is installed in plurality along an outer circumferential surface of the pipe on an inner surface of the housing.

7. The weld bead inspection apparatus of claim 1, wherein the pipe is installed to supply and discharge a gas in a substrate processing apparatus and substrate processing system for substrate processing.

8. The weld bead inspection apparatus of claim 7, wherein the inspection means comprises a leak sensor configured to determine whether the gas leaks.

9. The weld bead inspection apparatus of claim 1, wherein the defect determination unit determines whether the weld bead is defective through at least one of a width and height of the weld bead or whether a microhole exists in the weld bead, which are checked through the inspection means.

* * * * *